United States Patent
Yamaura

(10) Patent No.: US 9,997,793 B2
(45) Date of Patent: Jun. 12, 2018

(54) GAS-LIQUID SEPARATOR INCLUDING FILTER AT EMISSION INLET FOR FUEL CELL

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 217 days.

(21) Appl. No.: 14/919,244

(22) Filed: Oct. 21, 2015

(65) Prior Publication Data

US 2016/0126568 A1 May 5, 2016

(30) Foreign Application Priority Data

Oct. 31, 2014 (JP) .................. 2014-223673

(51) Int. Cl.
*H01M 8/04* (2016.01)
*H01M 8/04119* (2016.01)

(52) U.S. Cl.
CPC .............................. *H01M 8/04164* (2013.01)

(58) Field of Classification Search
CPC ................... H01M 8/04164; B01D 2258/0208
USPC ................................ 429/414, 408, 413, 415
See application file for complete search history.

(56) References Cited

U.S. PATENT DOCUMENTS

| 8,685,587 | B2 | 4/2014 | Ohira et al. | |
| 2005/0199546 | A1* | 9/2005 | Rusta-Sallehy | H01M 8/04164 210/512.1 |
| 2009/0162730 | A1* | 6/2009 | Ohira | H01M 8/04253 429/410 |
| 2011/0315018 | A1* | 12/2011 | Moens | B01D 46/0004 96/400 |
| 2015/0107198 | A1 | 4/2015 | Yamaura | |
| 2016/0126567 | A1* | 5/2016 | Yamaura | H01M 8/2465 429/414 |
| 2016/0141693 | A1* | 5/2016 | Hotta | H01M 8/04164 429/414 |

FOREIGN PATENT DOCUMENTS

| JP | 2006179417 A | * | 7/2006 | |
| JP | 2009-123453 | | 6/2009 | |
| WO | WO-2012016448 A1 | * | 2/2012 | ............. A47L 9/182 |

* cited by examiner

*Primary Examiner* — Sean P Cullen
(74) *Attorney, Agent, or Firm* — Greenblum & Bernstein, P.L.C.

(57) ABSTRACT

A gas-liquid separator includes a housing that draws in emission from a fuel cell unit. The gas-liquid separator separates water from the emission and drains the separated water out of the housing. The housing includes a case including an emission inlet, a cap including a drain port that drains the separated water out of the housing, and a filter fitted into the emission inlet from an inner side of the housing. The filter captures foreign matter entering the housing.

6 Claims, 3 Drawing Sheets

GAS-LIQUID SEPARATOR INCLUDING FILTER AT EMISSION INLET FOR FUEL CELL

BACKGROUND ART

The present invention relates to a gas-liquid separator for a fuel cell. The gas-liquid separator draws emission from a fuel cell unit into a housing and separates water from the emission. The gas-liquid separator then drains the separated water out of the housing.

A fuel cell device includes a fuel cell stack including a fuel cell unit and two end plates (refer to, for example, Japanese Laid-Open Patent Publication No. 2009-123453). The fuel cell unit is formed by stacking cells. The fuel cell unit is held between the two end plates in the stacked direction of the cells.

The fuel cell stack described in the publication includes passages for fuel gas (e.g., hydrogen) and oxidation gas (e.g., air) that are supplied to the fuel cell unit. The fuel cell stack also includes emission passages for draining surplus fuel gas and oxidation gas out of the fuel cell unit.

The fuel gas emission passage includes a gas-liquid separator that draws in the fuel gas emitted from the fuel cell unit (hereafter, referred to as the emission) and separates water from the emission. The water, which is separated from the emission, is drained from a drain valve.

The emission from the fuel cell unit may include foreign matter that becomes trapped in the fuel cell unit when the fuel cell unit is manufactured. When such foreign matter reaches the drain valve through the fuel gas emission passage, the foreign matter may become caught in the drain valve.

Thus, in the fuel cell stack described in the publication, an insertion hole, which extends from a lower surface of an end plate, is connected to the fuel gas emission passage, which extends through the end plate. A filter is fitted into the insertion hole to capture foreign matter that is suspended in the emission.

In the structure described in Japanese Laid-Open Patent Publication No. 2009-123453, the filter is coupled to the end plate. Thus, the end plate needs to include the insertion hole. As a result, the structure for coupling the filter is complicated.

It is an object of the present invention to provide a gas-liquid separator for a fuel cell that allows a filter to be coupled with a simple structure.

A gas-liquid separator for a fuel cell that achieves the above object includes a housing that draws in emission from a fuel cell unit. The gas-liquid separator separates water from the emission and drains the separated water out of the housing. The housing includes a case including an emission inlet, a cap including a drain port that drains the separated water out of the housing, and a filter fitted into the emission inlet from an inner side of the housing. The filter captures foreign matter entering the housing.

In the above configuration, the filter is coupled to the case using the emission inlet of the case. Thus there is no need for a separate insertion hole used to couple the filter.

DETAILED DESCRIPTION OF THE EMBODIMENTS

One embodiment will now be described with reference to FIGS. 1 to 5. The upper and lower directions as viewed in FIGS. 1 to 4 correspond to the vertical direction.

Figure 1:
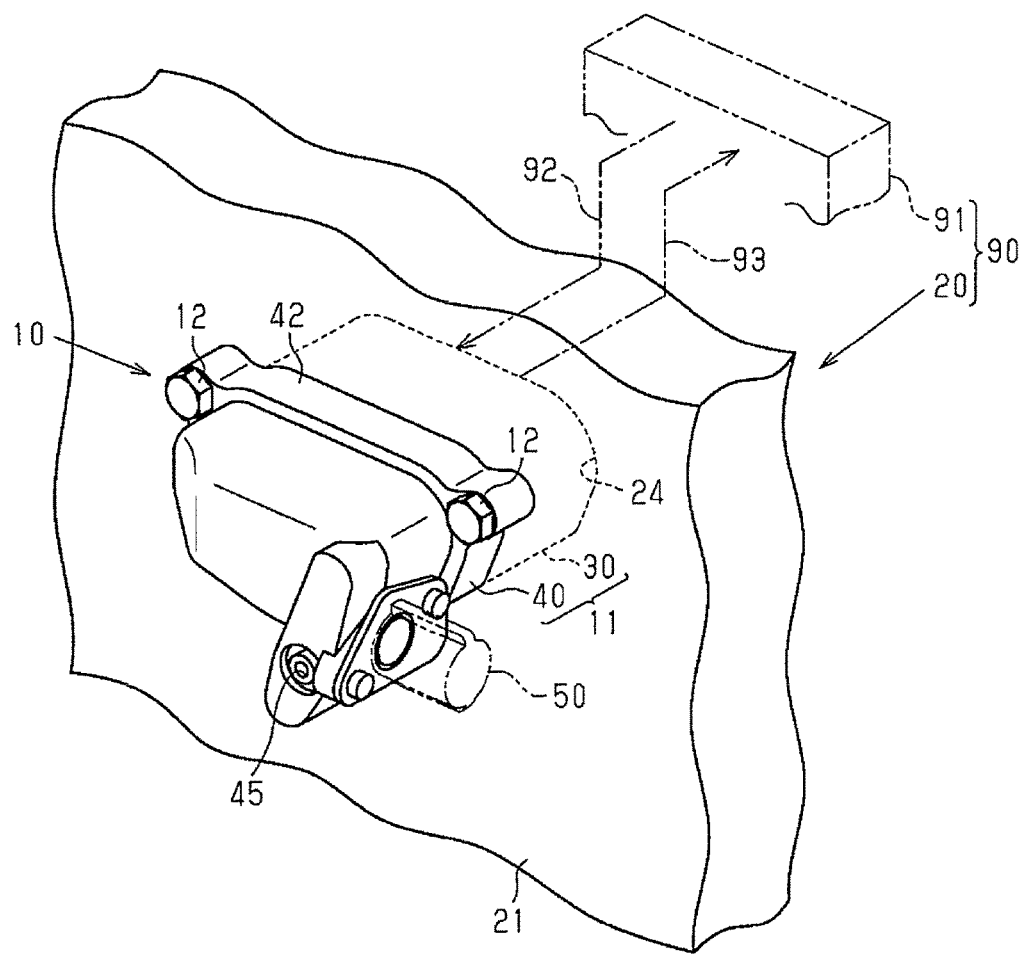
FIG. 1 is a perspective view showing one embodiment of a gas-liquid separator.

FIG. 1 shows a polymer electrolyte fuel cell that is installed in a vehicle and includes a fuel cell stack 90. The fuel cell stack 90 includes a fuel cell unit 91 and two end plates 20. The fuel cell unit 91 is formed by stacking cells (not shown). The fuel cell unit 91 is held between the two end plates 20 in the stacked direction of the cells. FIG. 1 shows only one of the two end plates 20 located on one end of the fuel cell unit 91. In FIG. 1, the end plate 20 is shown separated from the fuel cell unit 91.

The structure for circulating fuel gas will now be described focusing on the end plate 20. In the present embodiment, hydrogen is used as the fuel gas.

Figure 2:
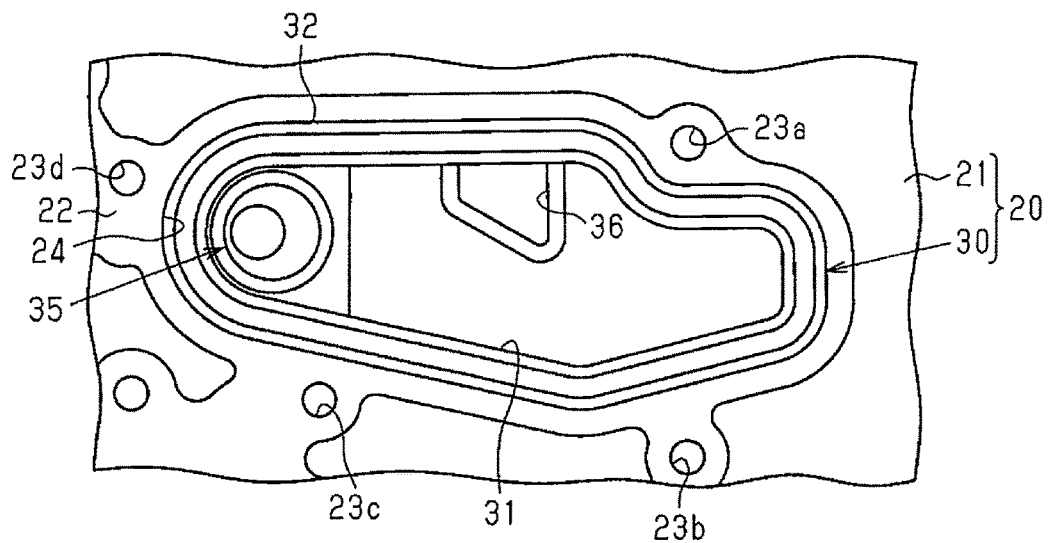
FIG. 2 is a front view showing the inner side of a case of the gas-liquid separator.
Figure 5:
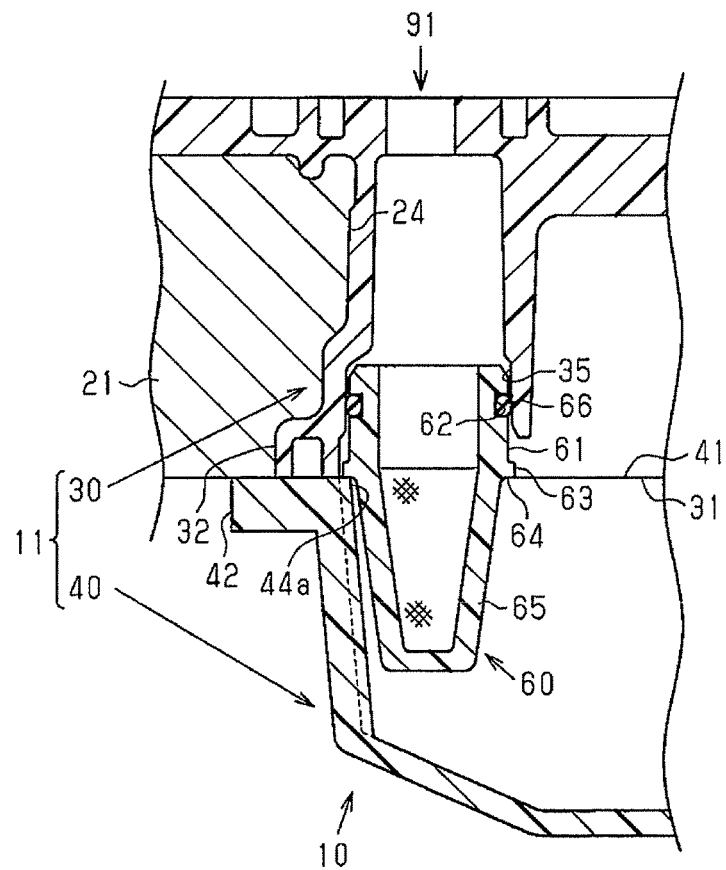
FIG. 5 is an enlarged cross-sectional view taken along line 5-5 in FIG. 4.

As shown in FIGS. 1, 2, and 5, the end plate 20 includes a plate body 21 formed from a metal material such as aluminum. A through hole 24 extends through the plate body 21 in the thickness direction of the plate body 21.

As shown in FIG. 1, the fuel cell stack 90 includes an emission passage 92 that emits fuel gas (hereinafter referred to as the emission) out of the fuel cell unit 91, a gas-liquid separator 10 that separates water from the emission delivered through the emission passage 92, and a return passage 93, which returns the emission from the gas-liquid separator 10 to the fuel cell unit 91.

The gas-liquid separator 10 includes a housing 11. The housing 11 includes a case 30 and a cap 40, each formed from a hard resin material.

Figure 4:
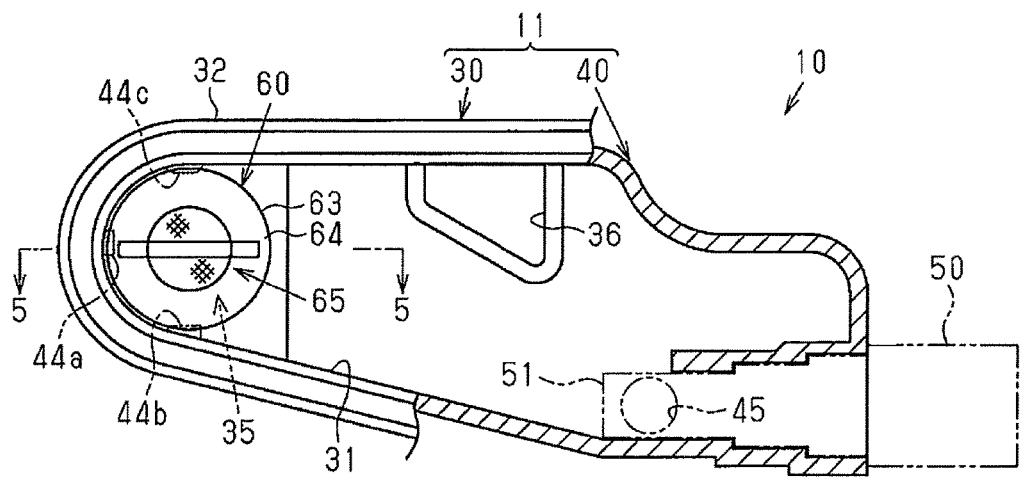
FIG. 4 is a cross-sectional view of the gas-liquid separator.

Referring to FIGS. 1, 2, and 5, the case 30, which is located in the through hole 24 of the plate body 21, is insert-molded and formed integrally with the plate body 21. As shown in FIGS. 2, 4, and 5, the case 30 includes an open end 31, and a flange 32 projects toward the outer side from the open end 31. The case 30 includes an emission inlet 35 located adjacent to the inner edge of the flange 32. The emission inlet 35 is connected to the emission passage 92. As shown in FIGS. 2 and 4, the case 30 includes an emission outlet 36, which is connected to the return passage 93. As shown in FIG. 2, the plate body 21 includes a seat surface 22 surrounding the flange 32. The seat surface 22 includes threaded holes 23a to 23d.

As shown in FIGS. 4 and 5, a filter 60 is fitted into the emission inlet 35 from an inner side of the housing 11. The filter 60 captures foreign matter that enters the housing 11 from the emission passage 92.

As shown in FIG. 5, the filter 60 includes a tubular basal portion 61, which is fitted into the emission inlet 35, and a filtering portion 65, which is arranged on the distal end of the basal portion 61. The filtering portion 65 is partially meshed. The basal portion 61 and the filtering portion 65 are formed from a resin material. The outer surface of the basal portion 61, which is opposed to the wall surface of the emission inlet 35, includes an annular groove 62. An O-ring 66 is fitted to the annular groove 62 to seal the gap between the basal portion 61 and the wall of the emission inlet 35. A large diameter portion 63 extends around the distal end of the basal portion 61.

Figure 3:
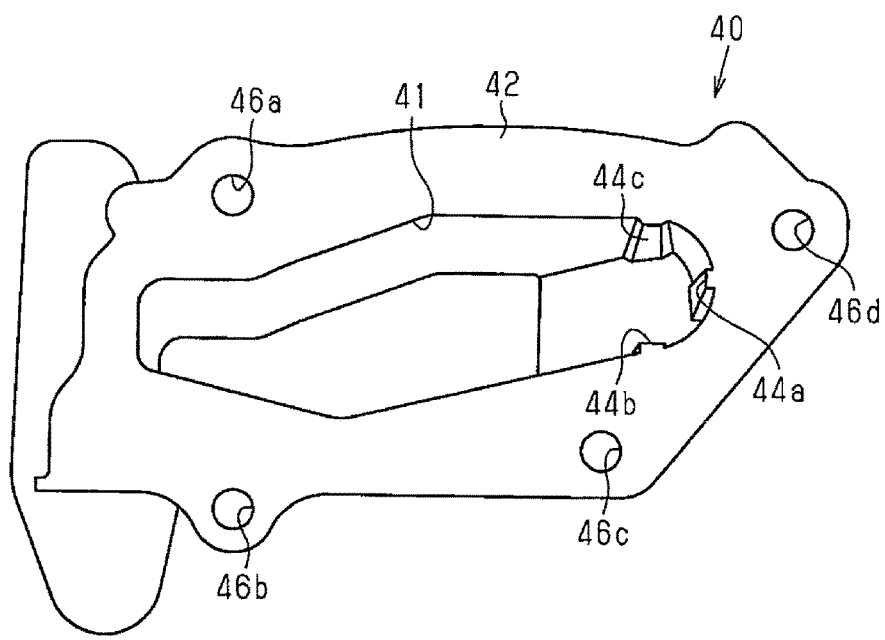
FIG. 3 is a front view showing the inner side of a cap of the gas-liquid separator.

As shown in FIGS. 3 and 5, the cap 40 includes an open end 41, and a flange 42 projects toward the outer side from the open end 41. The flange 42 includes bolt holes 46a to 46d respectively located at positions corresponding to the threaded holes 23a to 23d of the seat surface 22.

As shown in FIGS. 1 and 4, the cap 40 includes a drain port 45. The water separated from the emission is drained out of the housing 11 from the drain port 45. The cap 40 further includes a drain valve 50 that opens and closes the drain port 45. The drain valve 50 includes a valve member 51 that is moved by an actuator (not shown) in the sideward direction as viewed in FIG. 4 to open or close the drain port 45.

Bolts 12 are inserted through the bolt holes 46a to 46d of the cap 40 and tightened to the threaded holes 23a to 23d of the plate body 21 to fasten the cap 40 to the plate body 21, as shown in FIG. 1. A seal (not shown) is located between the flange 32 of the case 30 and the flange 42 of the cap 40 and between the seat surface 22 of the plate body 21 and the flange 42 of the cap 40.

As shown in FIGS. 3 and 4, three restriction projections 44a to 44c project from the inner edge of the flange 42 of the cap 40 at equal intervals. The restriction projections 44a to 44c extend to the bottom surface of the cap 40. As shown in FIG. 5, the restriction projection 44a abuts on an end surface 64 of the large diameter portion 63 of the filter 60. In the same manner as the restriction projection 44a, the other two restriction projections 44b and 44c abut on the end surface 64 of the filter 60 (refer to FIG. 4). More specifically, end surfaces of the restriction projections 44a to 44c are opposed to the end surface 64 of the large diameter portion 63 of the filter 60 in the direction in which the filter 60 is fitted into the emission inlet 35 (vertical direction as viewed in FIG. 5). Thus, the restriction projections 44a to 44c restrict separation of the filter 60 from the emission inlet 35. In this manner, the restriction projections 44a to 44c function as restrictions that restrict separation of the filter 60 from the emission inlet 35.

The operation of the present embodiment will now be described.

The gas-liquid separator 10 draws the emission emitted from the fuel cell unit 91 into the housing 11. Then, the gas-liquid separator 10 separates water from the emission and drains the separated water out of the housing 11.

In the gas-liquid separator 10, the emission inlet 35 of the case 30 is used to couple the filter 60 to the case 30. Thus, there is no need for another hole used to accommodate the filter 60. This simplifies the structure for coupling the filter 60.

In a fuel cell that is installed in a vehicle, vibration of the vehicle may vibrate the filter 60, which is fitted into the emission inlet 35. This may separate the filter 60 from the emission inlet 35.

In this regard, the gas-liquid separator 10 of the present embodiment restricts vibration of the filter 60 with the restriction projections 44a to 44c of the cap 40. This, in turn, restricts separation of the filter 60 from the emission inlet 35. Thus, in contrast with when restricting separation of the filter 60 with only the O-ring 66, the restriction projections 44a to 44c ensure that separation of the filter 60 is restricted.

The gas-liquid separator 10 of the present embodiment has the advantages described below.

(1) The housing 11 of the gas-liquid separator 10 includes the case 30 and the cap 40. The case 30 includes the emission inlet 35. The cap 40 includes the drain port 45 from which the water separated from the emission is drained out of the housing 11. The filter 60, which captures foreign matter that enters the housing 11, is fitted into the emission inlet 35 from the inner side of the housing 11.

In this structure, the emission inlet 35 of the case 30 is used to couple the filter 60 to the case 30. Thus, there is no need for another hole used to accommodate the filter 60. This simplifies the structure for coupling the filter 60.

(2) The cap 40 includes the restriction projections 44a to 44c that restrict separation of the filter 60 from the emission inlet 35.

In this structure, the restriction projections 44a to 44c of the cap 40 restrict vibration of the filter 60. This, in turn, restricts separation of the filter 60 from the emission inlet 35. Accordingly, the restriction projections 44a to 44c ensure that separation of the filter 60 is restricted.

(3) The case 30, the cap 40, and the filter 60 are each formed from a resin material. The restriction projections 44a to 44c are formed integrally with the inner edge of the open end 41 of the cap 40.

In this structure, portions of the emission passage extending from the emission inlet 35 to the emission outlet 36 are formed from a resin material. When such a passage is formed from a metal material, chemical reactions with the emission will ionize the metal material, and metal ions will be included in the emission that is returned to the fuel cell unit 91. However, the emission passage of the present embodiment is formed from a resin material and thus avoids such a situation. Accordingly, the present embodiment limits chemical deterioration, which is caused by metal ions, in the electrolyte membrane of the fuel cell unit 91.

(4) The filter 60 includes the end surface 64 that is opposed to the restriction projections 44a to 44c in the direction in which the filter 60 is fitted into the emission inlet 35. The end surface 64 extends throughout the circumference of the filter 60.

In this structure, the end surface 64 of the filter 60 and the restriction projections 44a to 44c of the cap 40 are opposed in the fitting direction. This further restricts separation of the filter 60.

Further, the end surface 64 is formed to extend throughout the circumference of the filter 60. Thus, when fitting the filter 60 into the emission inlet 35, there is no need to position the filter 60 so that the end surface 64 of the filter 60 is opposed to the restriction projections 44a to 44c. This facilitates the coupling of the filter 60 to the emission inlet 35.

(5) The end plate 20 includes the plate body 21 that is formed from a metal material. The case 30, which is formed from a resin material, is formed integrally with the plate body 21.

In this structure, the case 30 is formed as a portion of the end plate 20. This reduces the number of components as compared to a structure in which the case 30 and the end plate 20 are separate components and a drain passage extending through the end plate is connected to an emission inlet of the case by a pipe.

The above embodiment may be modified as follows.

A gap may be provided between the restriction projections 44a to 44c and the end surface 64 of the filter 60 as long as separation of the filter 60 from the emission inlet 35 can be restricted.

The gas-liquid separator 10 may be formed as a component that is separate from the end plate 20. In this case, a pipe may be used to connect a hole extending through the end plate 20 and the emission inlet 35 of the case 30.

The large diameter portion 63 does not have to extend entirely around the filter 60 in the circumferential direction.

The restriction projections 44*a* to 44*c* may be changed in quantity and size. Further, the restriction projections 44*a* to 44*c* may be omitted.

What is claimed is:

1. A gas-liquid separator for a fuel cell, the gas-liquid separator comprising:
    a housing that draws in emission from a fuel cell unit, wherein the gas-liquid separator separates water from the emission and drains separated water out of the housing; wherein
    the housing includes:
        a case including an emission inlet,
        a cap including a drain port that drains the separated water out of the housing, and
        a filter fitted into the emission inlet from an inner side of the housing such that the filter contacts both the case and the cap, wherein
        the filter captures foreign matter entering the housing.

2. The gas-liquid separator according to claim 1, wherein the gas-liquid separator is configured to separate the water with respect to a fuel cell stack including an end plate arranged on one end of the fuel cell unit,
    the end plate includes a plate body formed from a metal material, and
    the case is formed from a resin material and integrally with the plate body.

3. The gas-liquid separator according to claim 1, wherein the cap includes a restriction that restricts separation of the filter from the emission inlet.

4. The gas-liquid separator according to claim 3, wherein the cap includes an open end, and
    the restriction includes a projection formed integrally with an inner edge of the open end.

5. The gas-liquid separator according to claim 3, wherein the filter includes an end surface opposed to the restriction in a direction in which the filter is inserted into the emission inlet, and
    the end surface extends throughout a circumference of the filter.

6. The gas-liquid separator according to claim 3, wherein the restriction comprises a plurality of projections that project from an inner edge of a flange of the cap at equal intervals.

* * * * *